United States Patent
Taneda

(10) Patent No.: US 7,209,662 B2
(45) Date of Patent: Apr. 24, 2007

(54) WAVELENGTH MULTIPLEX TRANSMISSION DEVICE

(75) Inventor: Yasuhisa Taneda, Tokyo (JP)

(73) Assignee: NEC Corporation, Tokyo (JP)

( * ) Notice: Subject to any disclaimer, the term of this patent is extended or adjusted under 35 U.S.C. 154(b) by 770 days.

(21) Appl. No.: 10/306,410

(22) Filed: Nov. 29, 2002

(65) Prior Publication Data
US 2003/0113117 A1    Jun. 19, 2003

(30) Foreign Application Priority Data
Nov. 29, 2001   (JP)   .............................. 2001-363726

(51) Int. Cl.
*H04J 14/02* (2006.01)
(52) U.S. Cl. .......................................... 398/81; 398/79
(58) Field of Classification Search .......... 398/43–103; 359/124
See application file for complete search history.

(56) References Cited

U.S. PATENT DOCUMENTS

| | | | | |
|---|---|---|---|---|
| 6,008,920 | A * | 12/1999 | Hendrix ........................ | 398/79 |
| 6,191,877 | B1 * | 2/2001 | Chraplyvy et al. ............. | 398/9 |
| 6,486,993 | B1 * | 11/2002 | Kuroshima ................... | 398/81 |
| 6,487,336 | B1 * | 11/2002 | Yao .............................. | 385/24 |
| 6,639,715 | B2 * | 10/2003 | Naito et al. .................. | 359/334 |
| 6,731,877 | B1 * | 5/2004 | Cao ............................. | 398/91 |
| 6,738,181 | B1 * | 5/2004 | Nakamoto et al. ........... | 359/337 |
| 6,810,214 | B2 * | 10/2004 | Chbat et al. ................. | 398/160 |
| 2002/0093705 | A1 * | 7/2002 | Okano et al. ................ | 359/124 |

FOREIGN PATENT DOCUMENTS

| | | |
|---|---|---|
| JP | 09-046318 | 2/1997 |
| JP | 11-122178 | 4/1999 |
| JP | 11-215058 | 8/1999 |
| JP | 11-284574 | 10/1999 |
| JP | 11-313045 | 11/1999 |
| JP | 11-330595 | 11/1999 |
| JP | 2000-078081 | 3/2000 |
| JP | 2000-174701 | 6/2000 |
| JP | 2000-228649 | 8/2000 |
| JP | 2001-111496 | 4/2001 |
| JP | 2003-046448 | 2/2003 |

* cited by examiner

*Primary Examiner*—Kenneth Vanderpuye
*Assistant Examiner*—Luis Garcia
(74) *Attorney, Agent, or Firm*—Young & Thompson

(57) ABSTRACT

The wavelength multiplex transmission device of the present invention includes a block band unit (block dispersion compensating unit etc.) for subjecting a plurality of signal lights of different wavelengths to dispersion compensation on a band basis and outputting the compensated signal lights, a CW light output unit (CW light source unit etc.) for outputting a CW light which supplements power of the signal light, a band multiplexing unit for multiplexing all the signal lights output from the block band unit together with the CW light output from the CW light output unit, and a total band optical amplifier for amplifying all the signal lights multiplexed by the band multiplexing unit in the lump and transmitting the amplified signal lights to a transmission path.

15 Claims, 7 Drawing Sheets

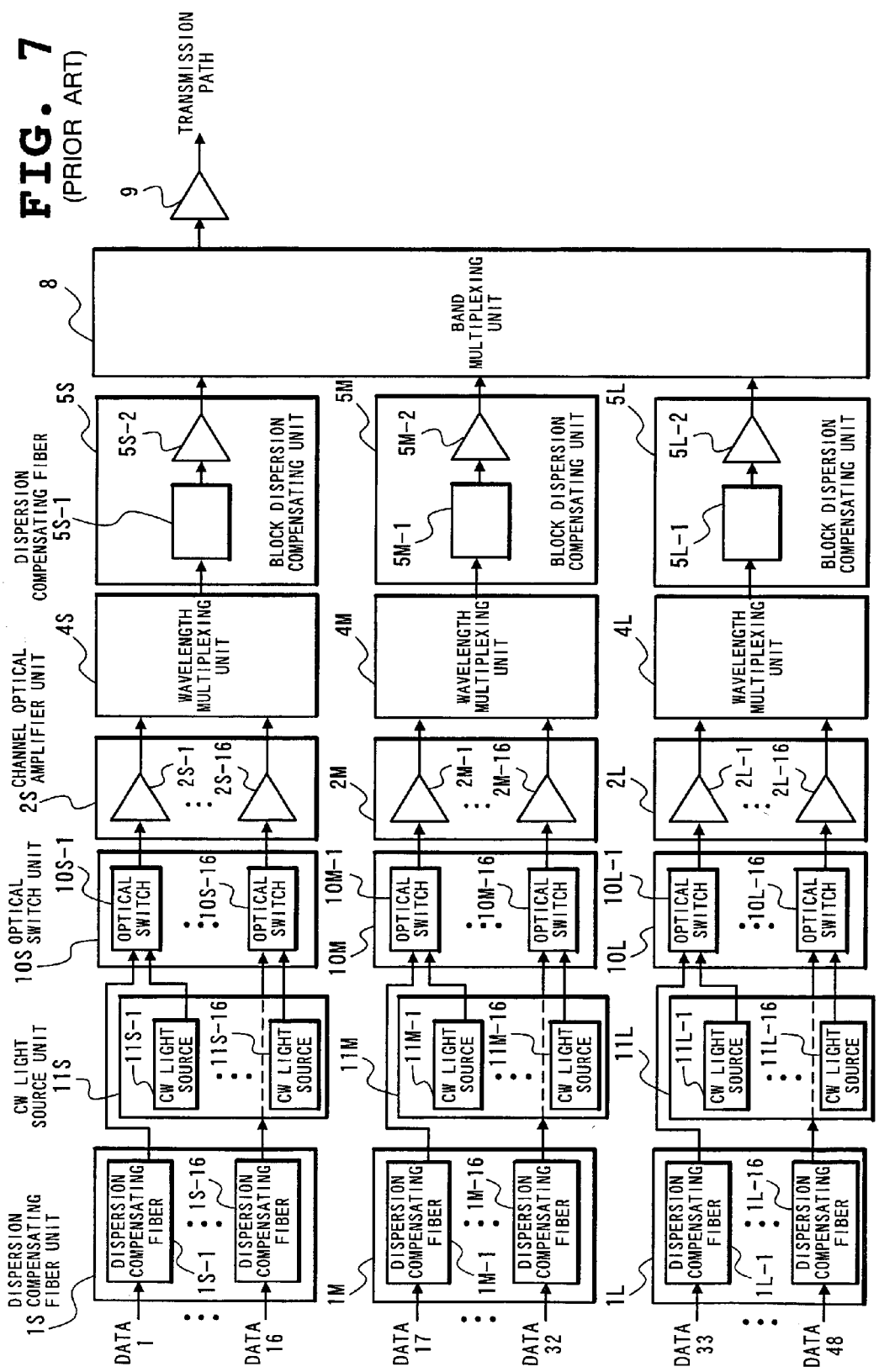

WAVELENGTH MULTIPLEX TRANSMISSION DEVICE

BACKGROUND OF THE INVENTION

1. Field of the Invention

The present invention relates to a wavelength multiplex transmission device in the field of optical communication and, more particularly, to a wavelength multiplex transmission device enabling in-service expansion of signal lights without cutting off existing signal lights.

2. Description of the Related Art

In the recent field of optical communication, the mainstream is wavelength multiplex transmission which intends to expand a transmission capacity by multiplexing different signal wavelengths, in which a system equivalent to 10 Gb/s and 64 waves is operated. Even with a maximum transmission capacity of 64 channels, however, it is a common practice to have a less number of signal wavelengths introduced at initial operation than that and sequentially add signal lights according to a future demand. In the course of the expansion, neither error in signal light during service nor cut-off of a cable should be generated.

FIG. 7 is a block diagram showing a conventional wavelength multiplex transmission device. In the following, the device will be described with reference to the drawings. Although the total number of signal wavelengths is 48 here, basic structure of the device is the same regardless of the number of wavelengths.

In submarine cable communication, because a transmission distance is extremely long, dispersion in a transmission path causes deterioration of a signal waveform. "Dispersion" here represents a delay of a signal pulse due to a difference in a group velocity with respect to a wavelength. As a result, the longer a transmission distance becomes, the greater the effect of a delay on waveform deterioration becomes. Therefore, by applying reversal of the amount of dispersion generated on a submarine transmission path to a transmission device to compensate for the dispersion, waveform deterioration is suppressed.

In such dispersion compensation as described above, it is only necessary to apply a predetermined amount of dispersion individually to each signal. This method, however, is inefficient because device arrangement would be extremely large. Therefore, as illustrated in FIG. 7, it is efficient to divide the entire signal band into three, an S band, an M band and an L band and apply common dispersion to each band to compensate for shortage or excess of each signal on an individual channel basis. Since structure of the S band, the M band and the L band is the same, description will be made in the following with respect to the S band. Subscript n attached to a reference numeral denotes any of the integers from 1 to 16.

Signal lights DATA 1 to DATA 16 are applied to a dispersion compensating fiber unit 1S to have their shortages/excesses compensated for, propagated through an optical switch unit 10S and amplified by a channel optical amplifier unit 2S, and then all the signal lights of the S band are multiplexed at a wavelength multiplexing unit 4S. While an optical switch 10S-n initially transmits a CW (continuous wave) light source 11S-n side, when a signal light is introduced, it is switched to transmit the signal light. In other words, the optical switch 10S-n corresponding to signal light power yet to be added receives input of the CW light.

The signal light having transmitted through the wavelength multiplexing unit 4S is uniformly subjected to block dispersion compensation by a dispersion compensating fiber 5S-1 of a block dispersion compensating unit 5S, is transmitted through a band optical amplifier 5S-2 for compensating for a pass loss at the dispersion compensating fiber 5S-1 and is then applied to a band multiplexing unit 8.

The foregoing is the description made of the S band, which is also the case with the M band and the L band. Then, the signal light and the CW light are output from the band multiplexing unit 8 and after being amplified to predetermined power by a total band optical amplifier 9, output to a transmission path.

In common band amplifier and total band amplifier, wavelength dependency of a gain changes with input power. Therefore, if no CW light source exists, signal light power output onto the transmission path will vary in an initial mode and a final mode where expansion of the total signal lights is completed, so that an error might occur due to a shortage of a gain in a signal light of a certain wavelength. To prevent such problem, supplement with a CW light is made in advance.

The above-described conventional wavelength multiplex transmission device, however, has the following shortcomings.

The device is structured such that a CW light for supplementing signal light power in preparation for future expansion propagates through the dispersion compensating fiber 5S-1 and the band optical amplifier 5S-2 for compensating for a pass loss, etc. of the block dispersion compensating unit 5S.

Since the block dispersion compensating unit 5S is an optical part necessary for suppressing waveform deterioration of a signal light, the CW light needs not to be propagated to the block dispersion compensating unit 5S. In other words, the structure of the conventional wavelength multiplex transmission device in which a CW light propagates through the block dispersion compensating unit and the like at the time of initial operation is adopted although it is not an essential structure for satisfying transmission characteristics, which is a factor of an increase in initial costs of the device and device scale as well.

SUMMARY OF THE INVENTION

Thus, an object of the present invention is to provide a wavelength multiplex transmission device which not only enables constant optical amplification characteristics to be maintained at the time of expansion while involving no in-service signal light error but also realizes suppression of initial costs and saving of space.

According to one aspect of the invention, a wavelength multiplex transmission device, comprises a block band unit for subjecting a plurality of signal lights of different wavelengths to dispersion compensation on a band basis and outputting the compensated signal lights, a CW light output unit for outputting a CW light which supplements power of the signal light, a band multiplexing unit for multiplexing all the signal lights output from the block band unit together with the CW light output from the CW light output unit, and a total band optical amplifier for amplifying all the signal lights multiplexed by the band multiplexing unit in the lump and transmitting the amplified signal lights to a transmission path.

In the preferred construction, the block band unit includes for each the band an individual dispersion compensating unit for subjecting each signal light to dispersion compensation, a wavelength multiplexing unit for multiplexing all the signal lights subjected to dispersion compensation by the individual dispersion compensating unit, and a block dispersion compensating unit for subjecting all the signal lights multiplexed by the wavelength multiplexing unit to dispersion compensation.

In another preferred construction, the individual dispersion compensating unit includes a first dispersion compensating fiber for conducting dispersion compensation with an amount of compensation differing with each signal light, a channel optical amplifier for compensating for a pass loss of each signal light at the first dispersion compensating fiber and outputting the compensated signal light, and a first optical attenuator for adjusting power level of each signal light output from the channel optical amplifier.

In another preferred construction, so as to have constant total power of all the signal lights multiplexed by the wavelength multiplexing unit, the first optical attenuator has attenuation adjusted according to the number of the signal lights in question.

In another preferred construction, the block band unit includes for each the band an individual dispersion compensating unit for subjecting each signal light to dispersion compensation, a wavelength multiplexing unit for multiplexing all the signal lights subjected to dispersion compensation by the individual dispersion compensating unit, and a block dispersion compensating unit for subjecting all the signal lights multiplexed by the wavelength multiplexing unit to dispersion compensation, the block dispersion compensating unit includes a second dispersion compensating fiber for subjecting all the signal lights multiplexed by the wavelength multiplexing unit to dispersion compensation, a band optical amplifier for compensating for a pass loss of all the signal lights at the second dispersion compensating fiber and outputting the compensated signal lights, and a second optical attenuator for adjusting power level of all the signal lights output from the band optical amplifier.

In another preferred construction, the block band unit includes for each the band an individual dispersion compensating unit for subjecting each signal light to dispersion compensation, a wavelength multiplexing unit for multiplexing all the signal lights subjected to dispersion compensation by the individual dispersion compensating unit, and a block dispersion compensating unit for subjecting all the signal lights multiplexed by the wavelength multiplexing unit to dispersion compensation, the individual dispersion compensating unit includes a first dispersion compensating fiber for conducting dispersion compensation with an amount of compensation differing with each signal light, a channel optical amplifier for compensating for a pass loss of each signal light at the first dispersion compensating fiber and outputting the compensated signal light, and a first optical attenuator for adjusting power level of each signal light output from the channel optical amplifier, and the block dispersion compensating unit includes a second dispersion compensating fiber for subjecting all the signal lights multiplexed by the wavelength multiplexing unit to dispersion compensation, a band optical amplifier for compensating for a pass loss of all the signal lights at the second dispersion compensating fiber and outputting the compensated signal lights, and a second optical attenuator for adjusting power level of all the signal lights output from the band optical amplifier.

In another preferred construction, the block band unit includes for each the band an individual dispersion compensating unit for subjecting each signal light to dispersion compensation, a wavelength multiplexing unit for multiplexing all the signal lights subjected to dispersion compensation by the individual dispersion compensating unit, and a block dispersion compensating unit for subjecting all the signal lights multiplexed by the wavelength multiplexing unit to dispersion compensation, the individual dispersion compensating unit includes a first dispersion compensating fiber for conducting dispersion compensation with an amount of compensation differing with each signal light, a channel optical amplifier for compensating for a pass loss of each signal light at the first dispersion compensating fiber and outputting the compensated signal light, and a first optical attenuator for adjusting power level of each signal light output from the channel optical amplifier, and the block dispersion compensating unit includes a second dispersion compensating fiber for subjecting all the signal lights multiplexed by the wavelength multiplexing unit to dispersion compensation, a band optical amplifier for compensating for a pass loss of all the signal lights at the second dispersion compensating fiber and outputting the compensated signal lights, and a second optical attenuator for adjusting power level of all the signal lights output from the band optical amplifier, wherein so as to have constant total power of all the signal lights multiplexed by the wavelength multiplexing unit, the first optical attenuator has attenuation adjusted according to the number of the signal lights in question.

In another preferred construction, the block band unit includes for each the band an individual dispersion compensating unit for subjecting each signal light to dispersion compensation, a wavelength multiplexing unit for multiplexing all the signal lights subjected to dispersion compensation by the individual dispersion compensating unit, and a block dispersion compensating unit for subjecting all the signal lights multiplexed by the wavelength multiplexing unit to dispersion compensation, the block dispersion compensating unit includes a second dispersion compensating fiber for subjecting all the signal lights multiplexed by the wavelength multiplexing unit to dispersion compensation, a band optical amplifier for compensating for a pass loss of all the signal lights at the second dispersion compensating fiber and outputting the compensated signal lights, and a second optical attenuator for adjusting power level of all the signal lights output from the band optical amplifier, wherein so as to have power of each signal light output from the band optical amplifier fixed regardless of the number of the signal lights in question, the second optical attenuator has attenuation adjusted according to attenuation of the first optical attenuator.

In another preferred construction, the block band unit includes for each the band an individual dispersion compensating unit for subjecting each signal light to dispersion compensation, a wavelength multiplexing unit for multiplexing all the signal lights subjected to dispersion compensation by the individual dispersion compensating unit, and a block dispersion compensating unit for subjecting all the signal lights multiplexed by the wavelength multiplexing unit to dispersion compensation, the individual dispersion compensating unit includes a first dispersion compensating fiber for conducting dispersion compensation with an amount of compensation differing with each signal light, a channel optical amplifier for compensating for a pass loss of each signal light at the first dispersion compensating fiber and outputting the compensated signal light, and a first optical attenuator for adjusting power level of each signal light output from the channel optical amplifier, and the block dispersion compensating unit includes a second dispersion compensating fiber for subjecting all the signal lights multiplexed by the wavelength multiplexing unit to dispersion compensation, a band optical amplifier for compensating for a pass loss of all the signal lights at the second dispersion compensating fiber and outputting the compensated signal lights, and a second optical attenuator for adjusting power level of all the signal lights output from the band optical amplifier, wherein so as to have power of each signal light output from the band optical amplifier fixed regardless of the number of the signal lights in question, the second optical attenuator has attenuation adjusted according to attenuation of the first optical attenuator.

In another preferred construction, the block band unit includes for each the band an individual dispersion compensating unit for subjecting each signal light to dispersion compensation, a wavelength multiplexing unit for multiplexing all the signal lights subjected to dispersion compensation by the individual dispersion compensating unit, and a block dispersion compensating unit for subjecting all the signal lights multiplexed by the wavelength multiplexing unit to dispersion compensation, the individual dispersion compensating unit includes a first dispersion compensating fiber for conducting dispersion compensation with an amount of compensation differing with each signal light, a channel optical amplifier for compensating for a pass loss of each signal light at the first dispersion compensating fiber and outputting the compensated signal light, and a first optical attenuator for adjusting power level of each signal light output from the channel optical amplifier, and the block dispersion compensating unit includes a second dispersion compensating fiber for subjecting all the signal lights multiplexed by the wavelength multiplexing unit to dispersion compensation, a band optical amplifier for compensating for a pass loss of all the signal lights at the second dispersion compensating fiber and outputting the compensated signal lights, and a second optical attenuator for adjusting power level of all the signal lights output from the band optical amplifier, wherein so as to have constant total power of all the signal lights multiplexed by the wavelength multiplexing unit, the first optical attenuator has attenuation adjusted according to the number of the signal lights in question, and so as to have power of each signal light output from the band optical amplifier fixed regardless of the number of the signal lights in question, the second optical attenuator has attenuation adjusted according to attenuation of the first optical attenuator.

In another preferred construction, the band multiplexing unit multiplexes all the signal lights output from the block band unit together with the CW light output from the CW light output unit by using a band-pass filter which transmits only a light of a specific band and reflects lights of other bands.

In another preferred construction, the block band unit includes for each the band an individual dispersion compensating unit for subjecting each signal light to dispersion compensation, a wavelength multiplexing unit for multiplexing all the signal lights subjected to dispersion compensation by the individual dispersion compensating unit, and a block dispersion compensating unit for subjecting all the signal lights multiplexed by the wavelength multiplexing unit to dispersion compensation, and the band multiplexing unit multiplexes all the signal lights output from the block band unit together with the CW light output from the CW light output unit by using a band-pass filter which transmits only a light of a specific band and reflects lights of other bands.

In another preferred construction, the CW light output unit includes for each the band a CW light source unit for generating a plurality of CW lights of different wavelengths, and a CW light wavelength multiplexing unit for multiplexing all the CW lights generated by the CW light source.

In another preferred construction, the block band unit includes for each the band an individual dispersion compensating unit for subjecting each signal light to dispersion compensation, a wavelength multiplexing unit for multiplexing all the signal lights subjected to dispersion compensation by the individual dispersion compensating unit, and a block dispersion compensating unit for subjecting all the signal lights multiplexed by the wavelength multiplexing unit to dispersion compensation, and the CW light output unit includes for each the band a CW light source unit for generating a plurality of CW lights of different wavelengths, and a CW light wavelength multiplexing unit for multiplexing all the CW lights generated by the CW light source.

In another preferred construction, the CW light output unit includes a CW light source for generating a plurality of CW lights of different wavelengths, an optical attenuator for adjusting power level of each CW light generated by the CW light source, and a wavelength multiplexing unit for multiplexing all the CW lights whose levels are adjusted by the optical attenuator.

Also, the optical attenuator has attenuation adjusted such that the CW light supplements the signal light output from the block band unit.

In order to solve the above-described problems, a wavelength multiplex transmission device according to the present invention has such structural features as follows. First feature is that application of a CW light through a band multiplexing unit prevents the CW light from propagating through a dispersion compensating fiber and a band optical amplifier of a block dispersion compensating unit and the like at the time of initial operation and during the following course of expansion. Second feature is that use of two kinds of optical attenuators, an optical attenuator arranged nearest to the input side and an optical attenuator for varying output power of a channel optical amplifier enables, even after signal expansion, input power of a band optical amplifier to be unchanged and channel power to be transmitted on a transmission path to be unchanged.

Then, the present invention produces the following effects because of adoption of such structure as described above. Since a CW light is applied through the band multiplexing unit, with respect to optical amplifiers succeeding the band multiplexing unit (total band optical amplifier and repeaters on a transmission path), constant amplifier operation can be maintained by supplementing signal light power as of before expansion with the CW light. As to components at a stage preceding to the band multiplexing unit, since only a path on which an introduced signal wavelength propagates should be ensured, a block band unit to which signal is yet to propagate and components preceding thereto can be omitted. Also as to input power of a band optical amplifier in a block dispersion compensating unit, it should be maintained at a fixed value regardless of the number of signal lights added, so that by reducing signal light power already expanded by as much power as input power of the band optical amplifier increased by the expansion of the signal light, the input power is maintained at a constant value.

More specifically, the present invention has the following features a) to e).

a) In order to suppress signal light waveform deterioration caused by the effect of dispersion in a transmission path by efficiently conducting dispersion compensation, the present invention includes a block band unit for dividing an entire signal band into an appropriate number of bands, a band multiplexing unit for multiplexing the divisional bands, a total band optical amplifier for amplifying all the multiplexed signal lights in the lump and transmitting the amplified signals to a transmission path to have predetermined power, and a CW light output unit for supplementing signal light power in preparation for future expansion. Then, by applying a CW light output from the CW light output unit to the band multiplexing unit, constant characteristics of the total band optical amplifier and repeaters on the transmission path can be maintained regardless of the number of signals added.

b) In the above-described a), the block band unit includes a dispersion compensating fiber unit whose compensation varies with a signal wavelength, a channel optical amplifier for compensating for a pass loss at the fiber unit and outputting the compensated signal light with higher power, an optical attenuator for adjusting level of each signal light power, a wavelength multiplexing unit for multiplexing signal lights in a band, a dispersion compensating fiber for uniformly and efficiently conducting dispersion compensation for a signal light in a block, a band optical amplifier for compensating for a pass loss at the fiber and an optical attenuator for uniformly varying a signal light level in the block. Then, with the use of only introduced signal light power, by making light power applied to the band optical amplifier be constant regardless of the number of signals introduced by means of the two kinds of optical attenuators, constant operation of the amplifiers can be maintained. In addition, channel power output to the band multiplexing unit remains unchanged.

c) In the above-described a) or b), control of the two kinds of optical attenuators and switching control of a CW light source and the signal light enable signal lights to be sequentially added without cutting off in-service signal lights.

d) In the above-described a) or b), connection of the CW light output unit with the band multiplexing unit and elimination of the need of other block band unit than that through which introduced signal light propagates lead to drastic reduction of initial costs and device scale.

e) The band multiplexing unit is a band multiplexing module for multiplexing signal lights from block band units which are divided into an arbitrary number and for receiving input of the CW light from other port by making use of transmission and reflection characteristics of a band-pass filter.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 7 is a block diagram showing a conventional wavelength multiplex transmission device.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
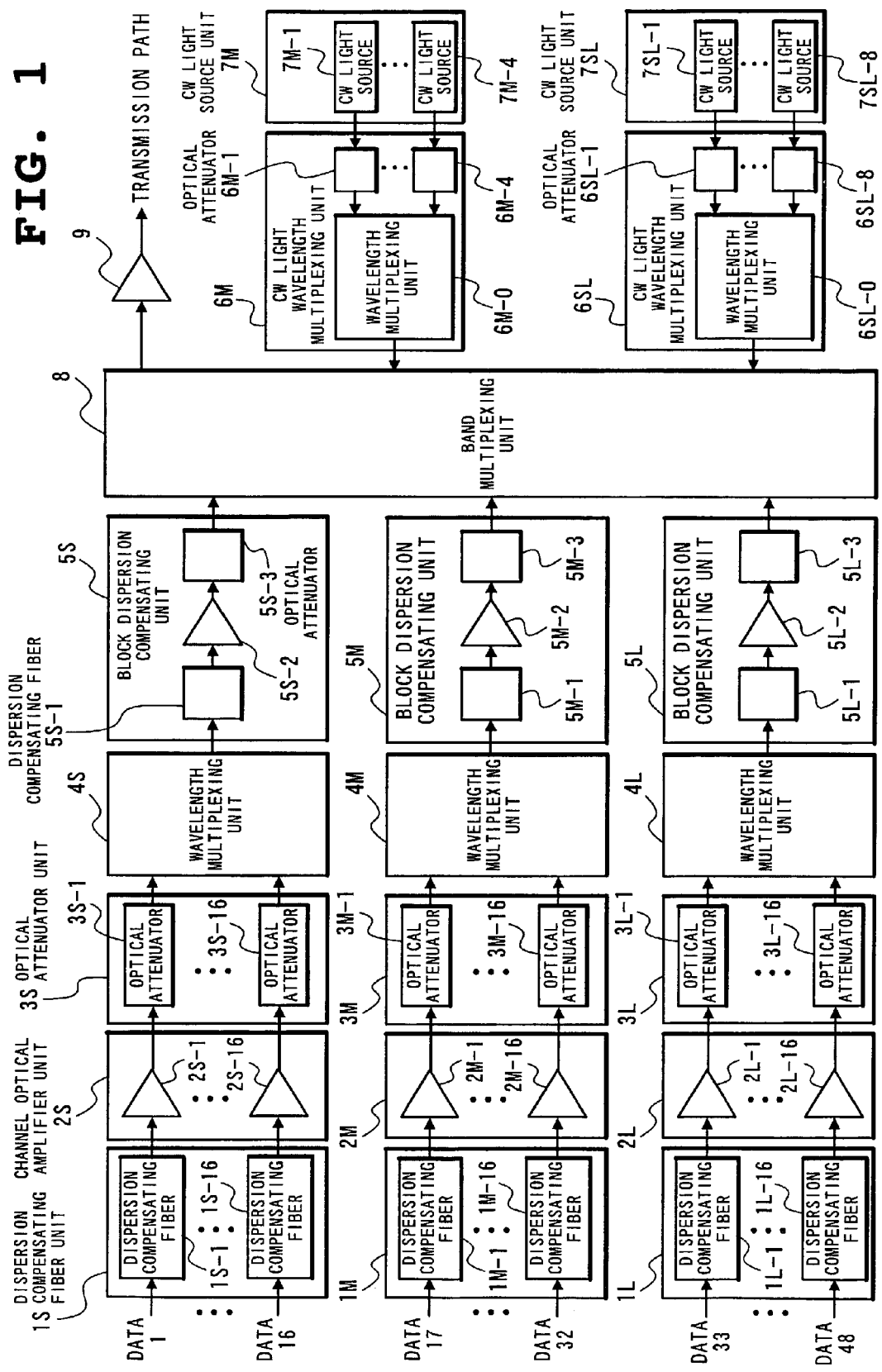
FIG. 1 is a block diagram showing one embodiment of a wavelength multiplex transmission device according to the present invention.

FIG. 1 is a block diagram showing one embodiment of a wavelength multiplex transmission device according to the present invention. In the following, description will be made with reference to the drawing.

In the present embodiment, signal bands are divided into three bands, an S band, an M band and an L band. Since basic structure of each band is the same, the following description will be made with respect mainly to the S band.

The wavelength multiplex transmission device of the present embodiment includes a block band unit (which will be described later) for subjecting a plurality of signal lights of different wavelengths to dispersion compensation on a band basis and outputting the compensated signal lights, a CW light outputting unit (which will be described later) for outputting a CW light which supplements power of a signal light, a band multiplexing unit 8 for multiplexing all the signal lights output from the block band unit together with the CW light output from the CW light outputting unit, and a total band optical amplifier 9 for amplifying all the signal lights multiplexed by the band multiplexing unit 8 in the lump and transmitting the amplified signal lights to a transmission path.

The block band unit includes, for each of the bands, an individual dispersion compensating unit (which will be described later) for subjecting each signal light to dispersion compensation, a wavelength multiplexing unit 4S for multiplexing all the signal lights subjected to dispersion compensation at the individual dispersion compensating unit, and a block dispersion compensating unit 5S for subjecting all the signal lights multiplexed by the wavelength multiplexing unit 4S to dispersion compensation.

The individual dispersion compensating unit includes dispersion compensating fibers 1S-1 to 1S-16 for conducting dispersion compensation with compensation varying with each signal light, channel optical amplifiers 2S-1 to 2S-16 for compensating for a pass loss of each signal light at the dispersion compensating fibers 1S-1 to 1S-16 and outputting the compensated signal light, and optical attenuators 3S-1 to 3S-16 for adjusting power level of each signal light output from the channel optical amplifiers 2S-1 to 2S-16.

The block dispersion compensating unit 5S includes a dispersion compensating fiber 5S-1 for subjecting all the signal lights multiplexed by the wavelength multiplexing unit 4S to dispersion compensation, a band optical amplifier 5S-2 for compensating for pass losses of all the signal lights at the dispersion compensating fiber 5S-1 and outputting the compensated signal lights, and an optical attenuator 5S-3 for adjusting power level of all the signal lights output from the band optical amplifier 5S-2.

The CW light outputting unit includes a CW light source unit 7SL for generating a plurality of CW lights of different wavelengths and a CW light wavelength multiplexing unit 6SL for multiplexing all the CW lights generated by the CW light source unit 7SL.

Signal lights of DATA1 to DATA16 are applied to a dispersion compensating fiber unit 1S and after passing through the dispersion compensating fibers 1S-1 to 1S-16 whose compensation varies with a wavelength, they are amplified by the channel optical amplifiers 2S-1 to 2S-16 for compensating for their pass losses and outputting further higher power. Subsequently, after each signal light has its level adjusted by the optical attenuators 3S-1 to 3S-16, all the signal lights of the S band are multiplexed by the wavelength multiplexing unit 4S. The multiplexed signal lights are applied to the block dispersion compensating unit 5S. The block dispersion compensating unit 5S, which is composed of the dispersion compensating fiber 5S-1, the band optical amplifier 5S-2 for compensating for a pass loss at the fiber, and the optical attenuator 5S-3, subjects all the signal lights of the S band to dispersion compensation to uniformly adjust the levels. The foregoing is the description made of the S band, which is also the case with the M band and the L band.

On the other hand, CW lights output from CW light sources 7M-1 to 7M-4 of the M band, after transmitting through optical attenuators 6M-1 to 6M-4, are multiplexed by a wavelength multiplexing unit 6M-0 and then applied to the band multiplexing unit 8. Similarly, CW lights output from CW light sources 7SL-1 to 7SL-8 of the S band and the L band, after transmitting through optical attenuators 6SL-1 to 6SL-8, are multiplexed by a wavelength multiplexing unit 6SL-0 and then applied to other port of the band multiplexing unit 8. Then, the multiplexed signal lights and CW lights are transmitted to a transmission path after being amplified to predetermined power by the total band optical amplifier 9. Here, the CW light is for supplementing signal light power as of before expansion and provides control to prevent such an error as will be clearly generated when the light is output to the transmission path simultaneously with a signal light of the same wavelength from occurring. Power of the CW light is adjusted, for example, such that a sum of the power in question and power of a corresponding signal light is constant.

Figure 2:
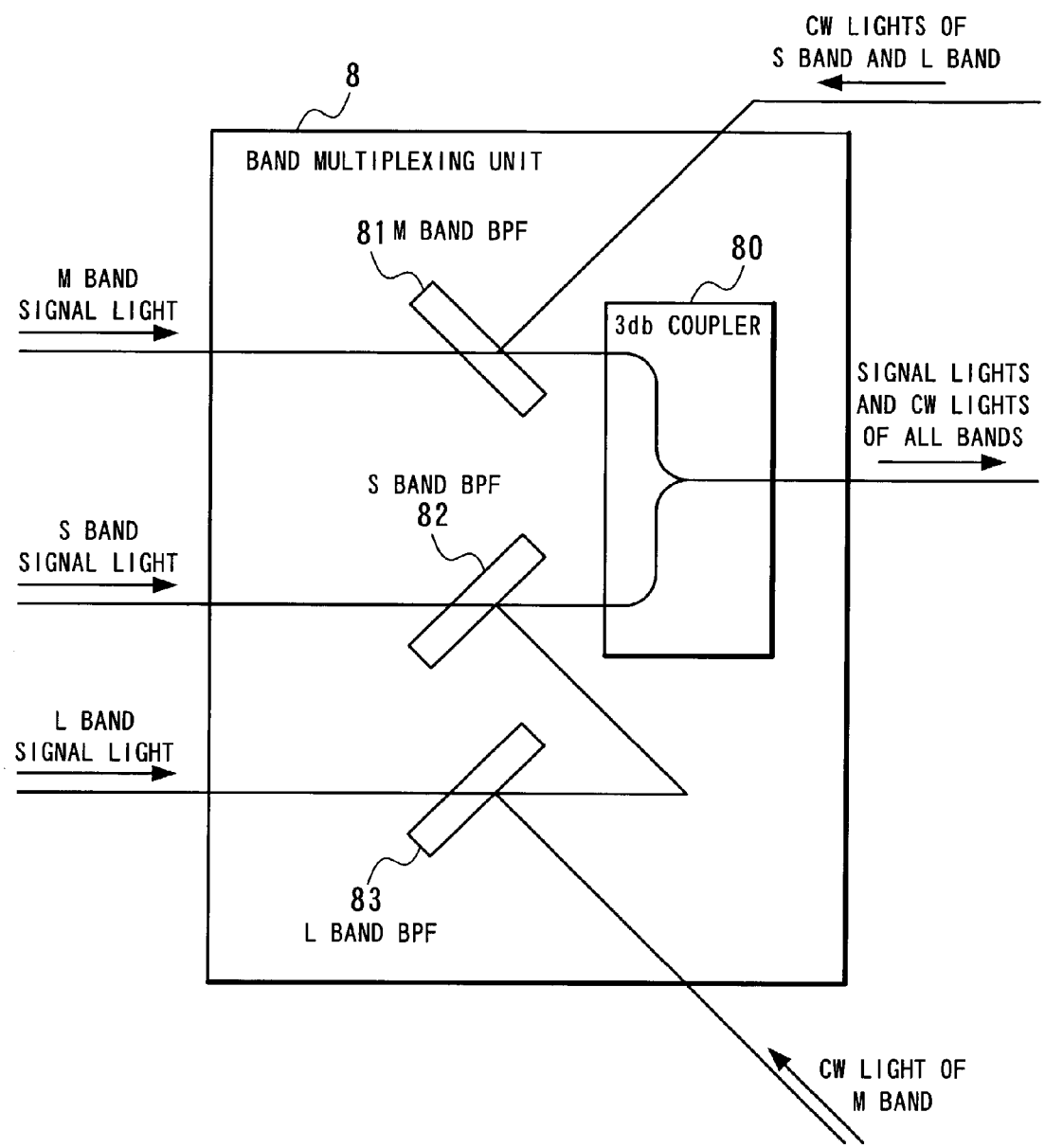
FIG. 2 is a diagram of an optical path showing one example of a band multiplexing unit in the wavelength multiplex transmission device illustrated in FIG. 1.

FIG. 2 is a structural diagram showing details of the band multiplexing unit 8. In the following, description will be made with reference to FIGS. 1 and 2.

The band multiplexing unit 8 includes an M band BPF (band-pass filter) 81, an S band BPF 82, an L band BPF 83 and a 3 dB optical coupler 80. BPF is characterized in transmitting only light of a specific band and reflecting lights of other bands. More specifically, signal light of the M band output from a block dispersion compensating unit 5M is transmitted through the M band BPF 81 and applied to one 3 dB optical coupler 80. On the other hand, signal light of the L band output from a block dispersion compensating unit 5L, after being transmitted through the L band BPF 83, is reflected by the S band BPF 82, multiplexed with S band signal light output from the block dispersion compensating unit 5S and applied to the other 3 dB optical coupler 80. CW light of the M band and CW lights of the S band and the L band are multiplexed by changing the BPF to which the lights are applied. In other words, the CW light of the M band will be multiplexed by using reflection of the L band BPF 83, while the CW lights of the S band and the L band will be multiplexed by using reflection of the M band BPF 81.

The present embodiment is thus structured such that signal lights and CW lights of all the bands can be ultimately output from the band multiplexing unit 8. Assuming that expansion starts with the S band, until all the signal lights of the S band are provided, dispersion compensating fibers 1M, 1L, channel optical amplifier units 2M, 2L, optical attenuator units 3M, 3L, wavelength multiplexing units 4M, 4L and the block dispersion compensating units 5M and 5L will be unnecessary.

Figure 3:
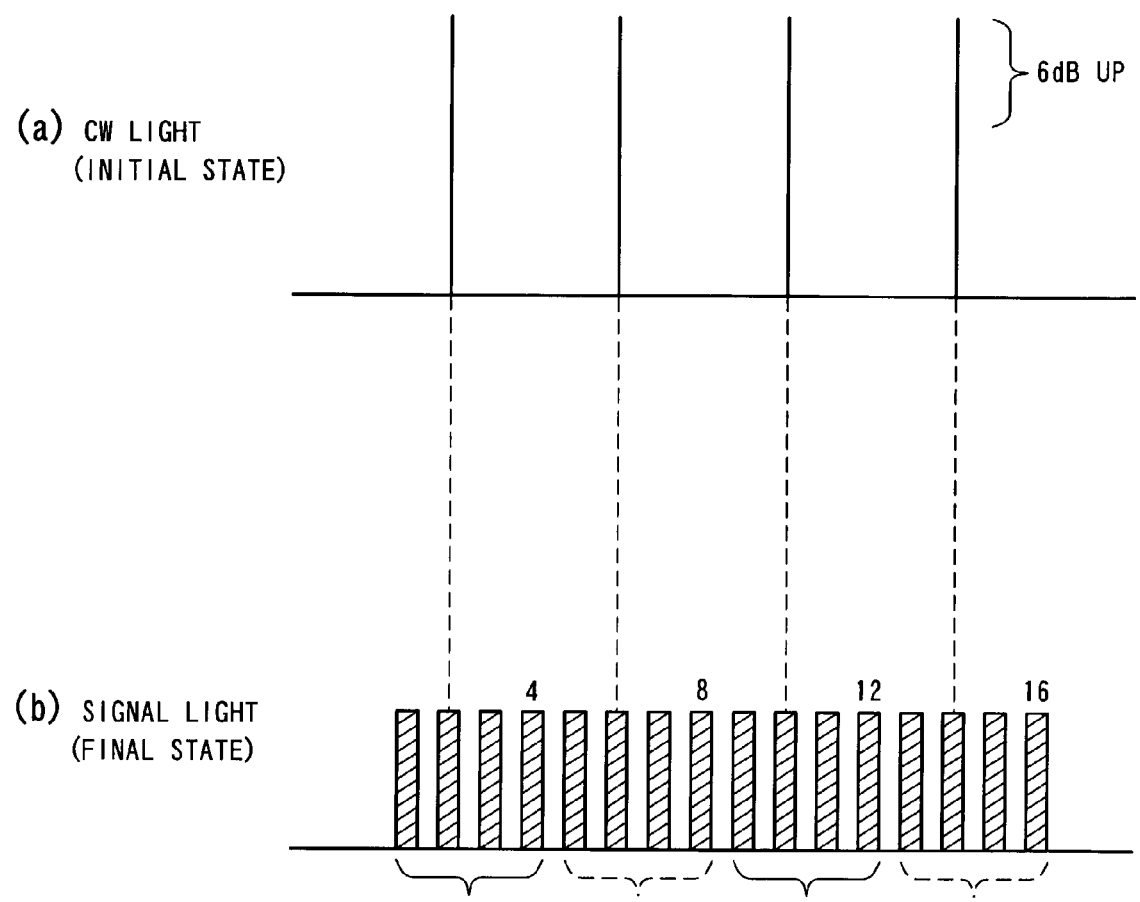
FIG. 3 is a graph showing distribution of wavelengths and power of a CW light and a signal light in the wavelength multiplex transmission device illustrated in FIG. 1, with FIG. 3(a) showing the CW light and FIG. 3(b) showing the signal light.
Figure 4:
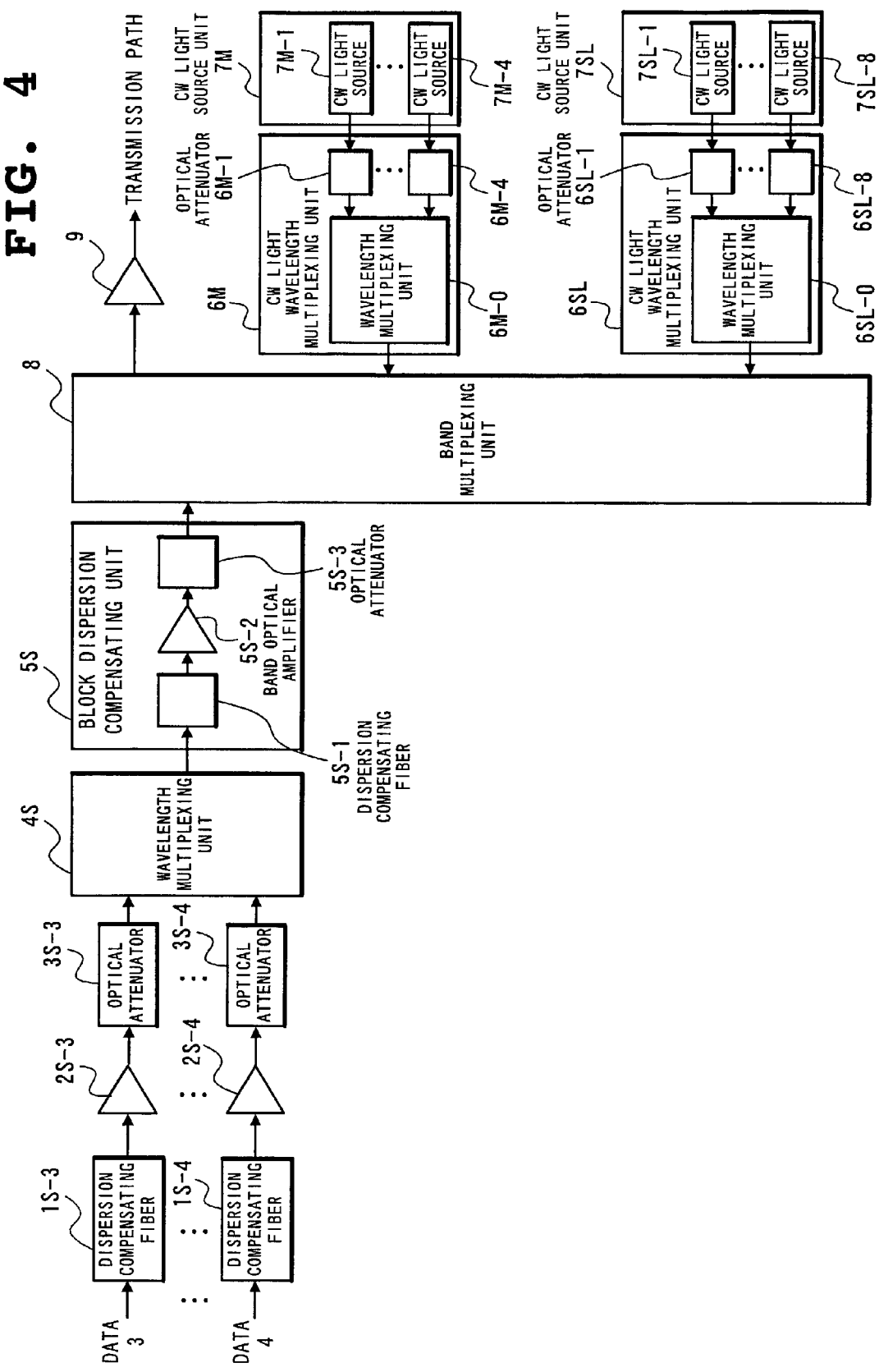
FIG. 4 is a diagram for use in explaining a case where two waves (DATA3, DATA4) of an S band are initially added in the wavelength multiplex transmission device of FIG. 1.
Figure 5:
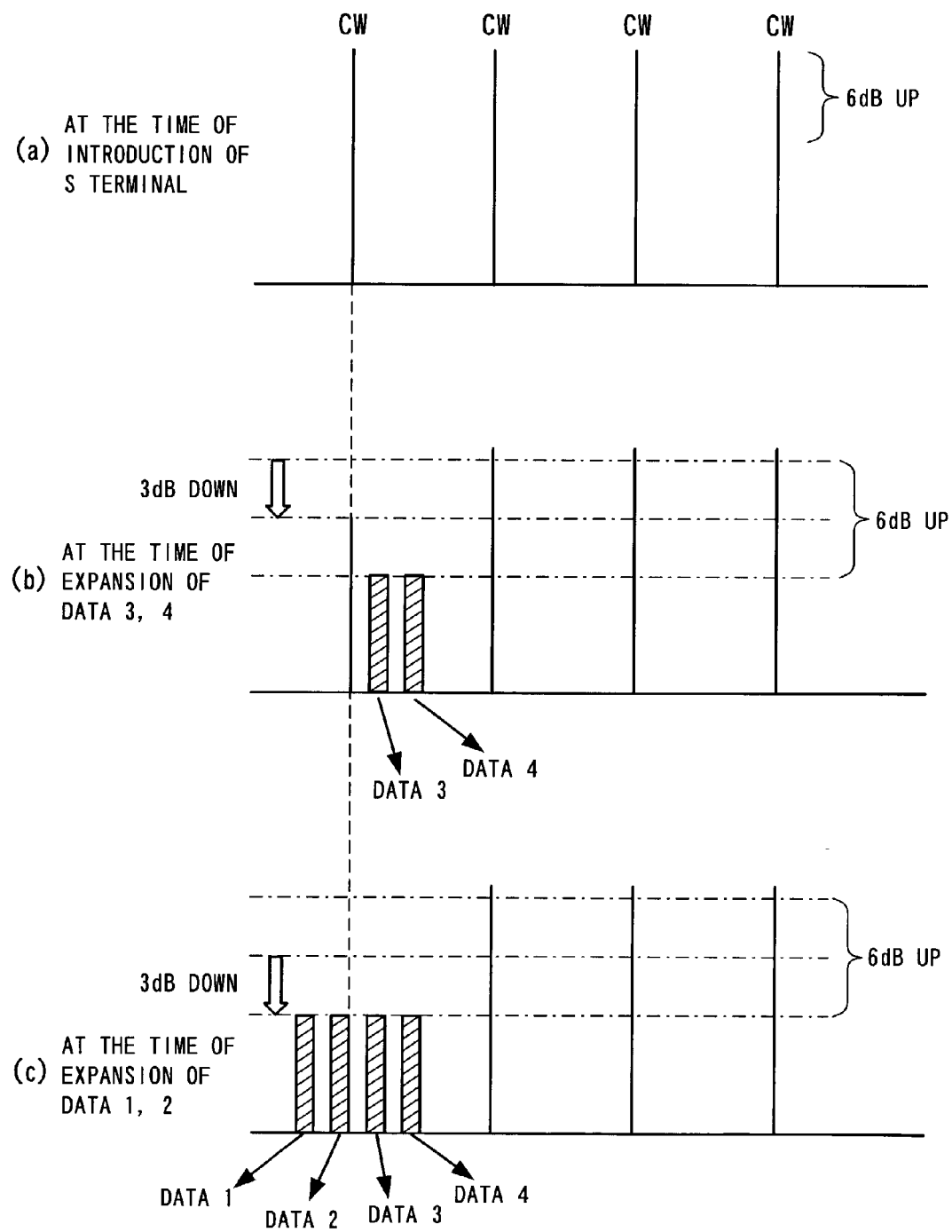
FIG. 5 is a graph showing a relationship between the CW light and the signal light when DATA1 to DATA4 are added in the wavelength multiplex transmission device of FIG. 1, with FIG. 5(a) showing that at the time when the S band is yet to be introduced, FIG. 5(b) showing that at the time when the DATA3 and DATA4 are added and FIG. 5(c) showing that at the time when the DATA1 and DATA2 are added.
Figure 6:
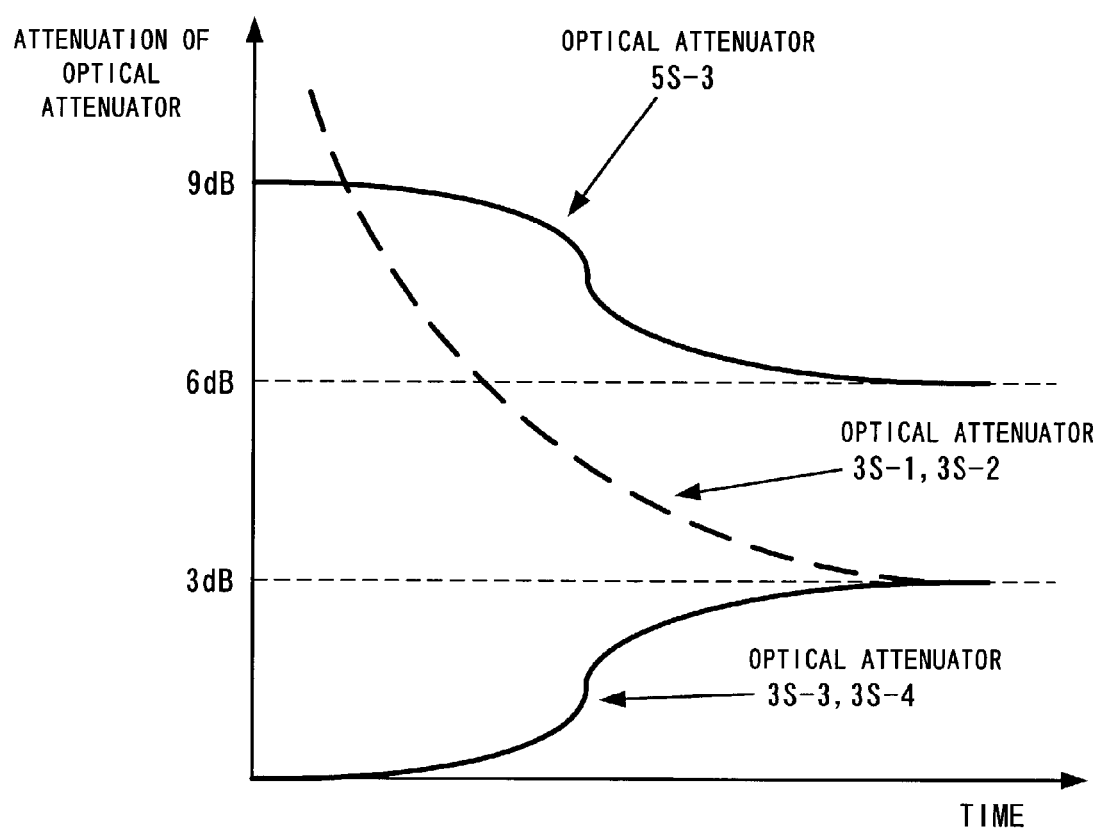
FIG. 6 is a graph showing how each optical attenuator changes in the wavelength multiplex transmission device illustrated in FIG. 1 at the time when the DATA1 and DATA4 are added.

FIG. 3 is a graph showing distribution of wavelengths and power of the CW light and the signal light. FIG. 4 is a diagram for use in explaining a case where two waves (DATA3, DATA4) are initially added to the S band. FIG. 5 is a graph showing a relationship between the CW light and the signal light at the expansion of the DATA 1 to DATA4. FIG. 6 is a graph showing how each optical attenuator changes at the time of expansion of the DATA 1 and DATA4. In the following, operation of the wavelength multiplex transmission device according to the present embodiment will be described with reference to FIGS. 1 to 6.

Description will be made of a case where signal light is newly added without cutting off existing signal lights in service in the present embodiment. FIG. 3 shows wavelength arrangement of the CW light and the signal light in the S band and image of power applied to the band multiplexing unit 8. Here, 16 signal light waves have their power supplemented with four CW light waves. In other words, the CW light is applied to the band multiplexing unit 8 at power higher by 6 dB than that of the signal light. In other words, it can be said that FIG. 3(a) shows an initial state before the expansion of the signal light and FIG. 3(b) shows a state where 16 signal light waves of the S band are added.

FIG. 4 shows a structure for a case where first two signal light waves (DATA3, DATA4) are introduced to the S band. The block dispersion compensating unit 5S and the band multiplexing unit 8 are not connected to each other. In the following, description will be made of a case where with respect to 16 waves of the S band, expansion is made on a two-wave basis as a specific example.

Maximum gains of channel optical amplifiers 2S-3 and 2S-4 are designed in advance such that as to power input to the band optical amplifier 5S-2, total signal light power obtained when 16 waves are ultimately added and signal light power obtained when only two waves are initially introduced are equal. In other words, the channel optical amplifier unit 2S has its output controlled to be constant. The amount of attenuation of optical attenuators 3S-3 and 3S-4 is assumed to be 0 dB. Since channel power output from the band optical amplifier 5S-2 is 9 dB higher (8 times) than original signal light power, by setting the attenuation of the optical attenuator 5S-3 to be 9 dB, arrange the band multiplexing unit 8 to receive input of predetermined signal light power. It is also possible to monitor total CW light power of the S band applied to the band multiplexing unit 8 before the band multiplexing unit 8 and the block dispersion compensating unit 5S are connected, thereby checking signal light power to be introduced based on the monitor value. Then, at the same time of connection of the band multiplexing unit 8 and the block dispersion compensating unit 5S, attenuate one CW light source wave supplementing the DATA1 to DATA4 by 3 dB by using the relevant optical attenuator 6SL-* (*=1-8) (transition from FIG. 5(a) to FIG. 5(b)). This is because one CW light wave corresponds to four signal light waves.

Next is operation in a case of expansion of the DATA1 and the DATA2. First, cut off the CW light supplementing the DATA1 to DATA4 by setting the attenuation of the optical attenuator 6SL-* to be infinite. Although CW light power of two waves out of the total signal power of 48 waves is cut off, the amount of resultant variation is as small as about 0.18 dB, so that no substantial effect will be exerted. The channel optical amplifiers 2S-1 and 2S-2 are assumed to have the same output power as the power of the channel optical amplifiers 2S-3 and 2S-4 and have their outputs controlled to be constant. With the attenuation of the attenuators 3S-1 and 3S-2 set to be infinite, apply the DATA1 and the DATA2 to the dispersion compensating fibers 1S-1 and 1S-2. Then, as shown in FIG. 6, simultaneously change attenuation of each attenuator to a predetermined value.

FIG. 6 will be described. In order to prevent expansion of the DATA1 and DATA2 from changing total input power of the band optical amplifier 5S-2, increase attenuation of the optical attenuators 3S-3 and 3S-4 from 0 to 3 dB. In addition, in order to transmit the signal lights of the DATA1 and DATA2, decrease the attenuation of the optical attenuators 3S-3 and 3S-4 from infinite to 3 dB. Moreover, in order to prevent each signal light power output from the band optical amplifier 5S-2 from changing, decrease the attenuation of the optical attenuator 5S-3 from 9 dB to 6 dB.

Although as to input power of the band optical amplifier 5S-2, channel power of the DATA3 and DATD4 is decreased by 3 dB, since the DATA1 and the DATA2 are applied so as to compensate for the reduction, total power remains unchanged. Also as to each signal light power applied to the band multiplexing unit 8, although it is attenuated by 3 dB by the attenuator 3S-* (*=1, 2, 3, 4), the loss of 3 dB is supplemented by the attenuator 5S-3, so that each signal light power remains unchanged. By thus compensating for input power of the band optical amplifier 5S-2 with signal light power introduced which is set in advance to be high and attenuating excessive channel output power from the band optical amplifier 5S-2 by the attenuator 5S-3, control is made to have predetermined power. Images of the foregoing signal power transition at the time of expansion of the DATA1 and DATA2 are shown in FIGS. 5(b) and 5(c).

Hereinafter, change a set value of each attenuator in the same manner to add the remaining DATA5-DATA16 of the S band. The method of expanding the M band and the L band is completely the same as that of the S band.

While the present embodiment is structured to divide the total number of 48 signal wavelengths into three and provide 12 CW light waves, the number of wavelengths, the number of band divisions and the number of CW lights are arbitrary and appropriately designed according to transmission characteristics and device structure.

According to the wavelength multiplex transmission device of the present invention, by multiplexing all the signal lights subjected to dispersion compensation and all the CW lights supplementing the signal lights by means of the band multiplexing unit, the need of components for signal light not in use which are arranged at a stage proceeding to the band multiplexing unit can be eliminated. It is therefore possible to realize reduction in scale and costs.

In addition, by providing the optical attenuator on the input side of the band optical amplifier whose gain has wavelength dependency changing according to input power to adjust attenuation of each signal light, input power of the band optical amplifier can be fixed at any time irrespective of the number of signal lights applied to the band optical amplifier. Moreover, by providing the optical attenuator on the output side of the band optical amplifier to adjust attenuation of each signal light, signal light attenuated at the input side of the band optical amplifier can be compensated for, so that power of each signal light output from the band optical amplifier can be fixed constantly irrespective of the number of signal lights applied to the band optical amplifier.

In other words, the present invention provides a wavelength multiplex transmission device which satisfies transmission characteristics with minimum necessary arrangement at initial introduction and enables signal lights to be sequentially added without cutting of in-service signal lights. This is because by applying the CW light which supplements signal light power as of before expansion through the band multiplexing unit, for a band other than that of the signal light necessary for the initial introduction, the need of components preceding to the band multiplexing unit can be eliminated.

Moreover, by adjusting attenuation of the plurality of optical attenuators according to the number of signal lights, input power of the band optical amplifier whose gain has wavelength dependency changing with input power can be fixed constantly regardless of the number of signal lights. It is, for example, possible to set power of already introduced signal lights to be higher in advance and when the number of signals is increased, attenuate the power set before the expansion, thereby maintaining total input power of the band optical amplifier at a fixed value.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A wavelength multiplex transmission device, comprising:
    a block band unit for subjecting a plurality of signal lights of different wavelengths to dispersion compensation on a band basis and outputting the compensated signal lights, a continuous wave light output unit outputting a continuous wave light which supplements power of each said compensated signal light and outputting a continuous wave light signal, a band multiplexing unit, connected to input i) the compensated signal lights output from the block band unit and ii) the continuous wave light signal output from the continuous wave light output unit, the band multiplexing unit multiplexing all the inputted compensated signal light output from said block band unit together with the continuous wave light output from said continuous wave light output unit, and a total band optical amplifier for amplifying all the signal lights multiplexed by the band multiplexing unit in the lump and transmitting the amplified signal lights to a transmission path, wherein, said block band unit includes for each said band:

and individual dispersion compensating unit for subjecting each signal light to dispersion compensation, wherein said individual dispersion compensating unit includes:

a first dispersion compensating fiber for conducting dispersion compensation with an amount of compensation differing with each signal, and a channel optical amplifier for compensating for a pass loss of each signal light at the first dispersion compensating fiber and output the compensated signal light, and a first optical attenuator for adjusting power level of each signal light output from the channel optical amplifier, a wavelength multiplexing unit for multiplexing all the signal lights subjected to dispersion compensation by the individual compensating unit, and a block dispersion compensating unit for subjecting all the signal lights multiplexed by the wavelength multiplexing unit to dispersion compensation, said block dispersion compensating unit including:

a second dispersion compensating fiber for subjecting all the signal lights multiplexed by said wavelength multiplexing unit to dispersion compensation, a band optical amplifier for compensating for a pass loss of all the signal lights at the second dispersion compensating fiber and outputting the compensated signal lights, and a second optical attenuator for adjusting power level of all the signal lights output from the band optical amplifier, and, wherein so as to have power of each signal light output from said band optical amplifier fixed regardless of the number of the signal lights, said second optical attenuator has attenuation adjusted according to attenuation of said first optical attenuator.

2. The wavelength multiplex device as set forth in claim 1, wherein so as to have constant total power of all the signal lights multiplexed by said wavelength multiplexing unit, said first optical attenuator has attenuation adjusted according to the number of signal lights.

3. The wavelength multiplex transmission device as set forth in claim 1, wherein said individual dispersion compensating unit including:

a first dispersion compensating fiber for conducting dispersion compensation with an amount of compensation differing with each signal light, a channel optical amplifier for compensating for a pass loss of each signal light at the first dispersion compensating fiber and outputting the compensated signal light, and a first optical attenuator for adjusting power level of each signal light output from the channel optical amplifier, and so as to have constant total power of all the signal lights multiplexed by said wavelength multiplexing unit, said first optical attenuator has attenuation adjusted according to the number of the signal lights.

4. The wavelength multiplex transmission device as set forth in claim 1, wherein said individual dispersion compensating unit including:

a first dispersion compensating fiber for conducting dispersion compensation with an amount of compensation differing with each signal light, a channel optical amplifier for compensating for a pass loss of each signal light at the first dispersion compensating fiber and outputting the compensated signal light, and a first optical attenuator for adjusting power level of each signal light output from the channel optical amplifier.

5. The wavelength multiplex transmission device as set forth in claim 1, wherein said individual dispersion compensating unit including:

a first dispersion compensating fiber for conducting dispersion compensation with an amount of compensation differing with each signal light, a channel optical amplifier for compensating for a pass loss of each signal light at the first dispersion compensating fiber and outputting the compensated signal light, and a first optical attenuator for adjusting power level of each signal light output from the channel optical amplifier, and so as to gave constant total power of all the signal lights multiplexed by said wavelength multiplexing unit, said first optical attenuator has attenuation adjusted according to the number of the signal lights.

6. The wavelength multiplex transmission device as set forth in claim 1, wherein said band multiplexing unit multiplexes all the signal lights output from said block band unit together with the continuous wave light output from said continuous wave light output unit by using a band-pass filter which transmits only a light of a specific band and reflects lights of other bands.

7. The wavelength multiplex device as set forth in claim 1, wherein said band multiplexing unit multiplexes all the signal lights output from said block band unit together with the continuous wave light output from said continuous wave light output unit by using a band-pass filter which transmits only a light of a specific band and reflects lights of other bands.

8. The wavelength multiplex transmission device as set forth in claim 1, wherein said continuous wave light output unit includes for each said band:

a continuous wave light source unit for generating a plurality of continuous wave lights of different wavelengths, and a continuous wave light wavelength multiplexing unit for multiplexing all the continuous wave lights generated by the continuous wave light source.

9. The wavelength multiplex device as set forth in claim 1, wherein
said continuous wave light output unit includes for each said band:
a continuous wave light source unit for generating a plurality of continuous wave lights of different wavelengths, and
a continuous wave light wavelength multiplexing unit for multiplexing all the continuous wave lights generated by the continuous wave light source.

10. The wavelength multiplex transmission device as set forth in claim 1, wherein
said continuous wave light output unit includes:
a continuous wave light source for generating a plurality of continuous wave lights of different wavelengths,
an optical attenuator for adjusting power level of each continuous wave light generated by the continuous wave light source, and
a wavelength multiplexing unit for multiplexing all the continuous wave lights whose levels are adjusted by the optical attenuator.

11. The wavelength multiplex transmission device as set forth in claim 10, wherein
said optical attenuator has attenuation adjusted such that said continuous wave light supplements the signal light output from said block band unit.

12. A wavelength multiplex transmission device, comprising:
a band multiplexing unit;
a block band unit subjecting each of plural signal lights, of different wavelengths, to dispersion compensation on a band basis and outputting the compensated signal lights to the band multiplexing unit;
a continuous wave light output unit outputting a continuous wave light to the band multiplexing unit,
the band multiplexing unit receiving the compensated signal lights at a first input and receiving the continuous wave light at a second input, the band multiplexing unit multiplexing all the received inputted compensated signal lights together with the received continuous wave light output and outputting a multiplexed combined signal; and
a total band optical amplifier receiving, in the lump, the multiplexed combined signal from the band multiplexing unit in the lump, amplifying the received multiplexed combined signal, and transmitting the amplified multiplexed combined signal to a transmission path, wherein
said block band unit includes for each said band:
and individual dispersion compensating unit for subjecting each signal light to dispersion compensation,
wherein said individual dispersion compensating unit includes:
a first dispersion compensating fiber for conducting dispersion compensation with an amount of compensation differing with each signal, and
a channel optical amplifier for compensating for a pass loss of each signal light at the first dispersion compensating fiber and output the compensated signal light, and a first optical attenuator for adjusting power level of each signal light output from the channel optical amplifier,
a wavelength multiplexing unit for multiplexing all the signal lights subjected to dispersion compensation by the individual compensating unit, and
a block dispersion compensating unit for subjecting all the signal lights multiplexed by the wavelength multiplexing unit to dispersion compensation,
said block dispersion compensating unit including:
a second dispersion compensating fiber for subjecting all the signal lights multiplexed by said wavelength multiplexing unit to dispersion compensation,
a band optical amplifier for compensating for a pass loss of all the signal lights at the second dispersion compensating fiber and outputting the compensated signal lights, and
a second optical attenuator for adjusting power level of all the signal lights output from the band optical amplifier, and,
wherein so as to have power of each signal light output from said band optical amplifier fixed regardless of the number of the signal lights, said second optical attenuator has attenuation adjusted according to attenuation of said first optical attenuator.

13. The device of claim 12, wherein,
three of the block band units are provided respectively for an S band, an M band, and an L band; and
two continuous wave light output units are provided respectively a first of the two units configured for one of the S, M, and L bands and a second of the two units configured for the other two of the S, M, and L bands.

14. The device of claim 12, wherein,
three of the block band units are provided respectively for an S band, an M band, and an L band; and
two continuous wave light output units are provided respectively a first of the two units for the M band and a second of the two units for both the S and L bands.

15. The device of claim 12, wherein,
three of the block band units are provided respectively for an S band, an M band, and an L band,
the band multiplexing unit comprises a first three inputs comprising respectively an S band input from the S band block band unit, an M band input from the M band block band unit, and an L band input from the L band block band unit, and
two continuous wave light input comprising respectively a first continuous wave light input for one and the S, M, and L bands and a second continuous wave light input for the other two of the S, M, and L bands.

* * * * *